April 14, 1953 S. G. HOOKER ET AL 2,634,668
AIRCRAFT CABIN VENTILATING OR PRESSURIZING APPARATUS
Filed April 8, 1947 2 SHEETS—SHEET 1
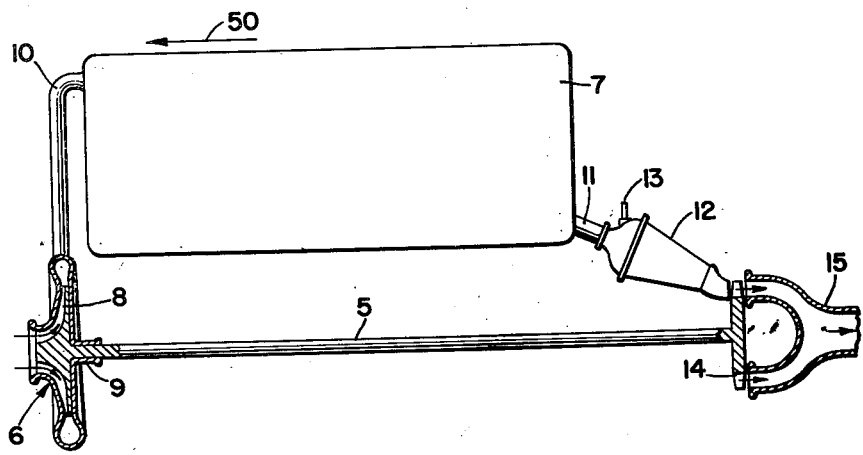
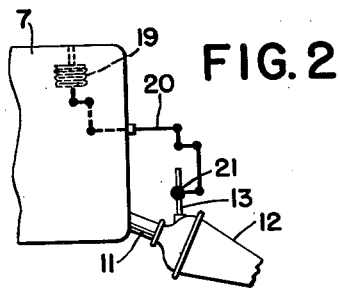
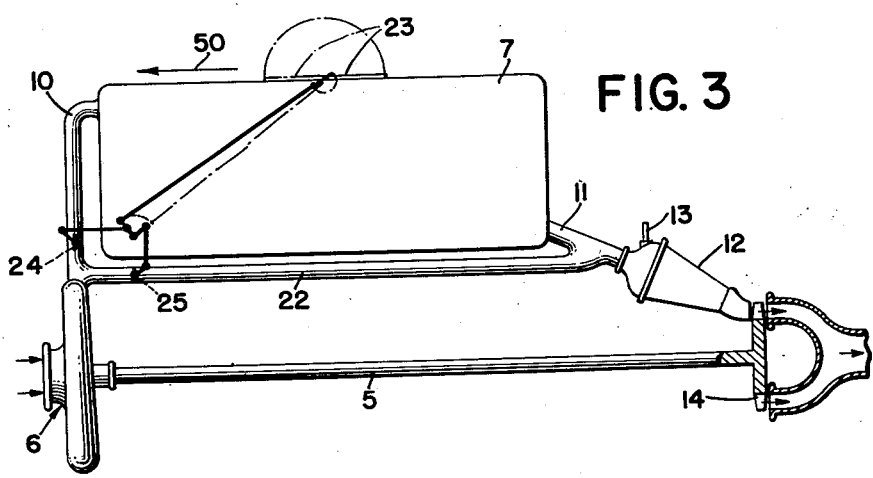
INVENTORS
STANLEY G. HOOKER
HARRY PEARSON.
BY Wilkinson & Mawhinney
ATTORNEYS

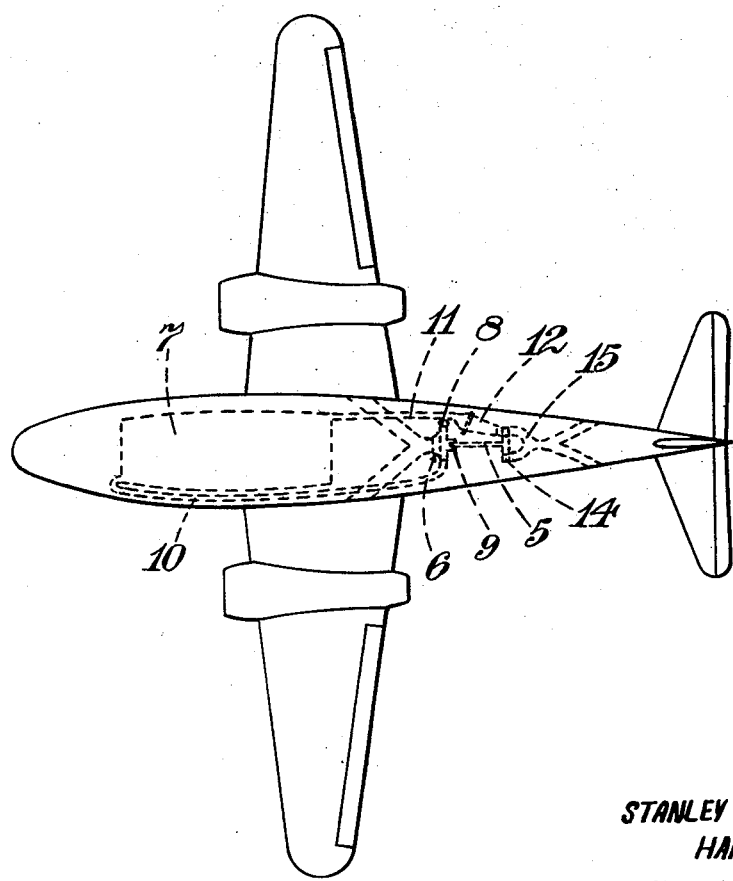

Patented Apr. 14, 1953

2,634,668

UNITED STATES PATENT OFFICE 2,634,668

AIRCRAFT CABIN VENTILATING OR PRESSURIZING APPARATUS

Stanley George Hooker, Sabden, near Blackburn, and Harry Pearson, Brierfield, England, assignors to Rolls-Royce Limited, Derby, England, a corporation of England Application April 8, 1947, Serial No. 740,254
In Great Britain April 15, 1946

2 Claims. (Cl. 98—1.5)

This invention relates to aircraft and in one of its aspects is concerned with aircraft of the kind in which the cabin is pressurized to enable the aircraft to operate at high altitudes. The usual practice is to maintain pressure in the cabin at that corresponding to an altitude of below 8,000 feet when the aircraft is flying at higher altitudes, and an air compressor delivering air to the cabin at the appropriate pressure is used for this purpose. It has been proposed to use the supercharging air compressor of one of the propelling engines or a separate air compressor driven by one of the propelling engines to pressurize the cabin of an aircraft but such an arrangement has the objections that long ducting from the compressor must be used in many cases and that failure of the engine results in the failure of the pressurizing system. There may also be difficulty in ensuring that the pressurizing air from an engine supercharger will be free from oil and it would not be possible to pass exhaust gases or de-icing liquids into the supercharger for de-icing purposes, since these would contaminate the cabin air. Again, the pressure delivered is determined by the rate of rotation of the engine which is undesirable since the pilot should have unrestricted control over the engine independent of the cabin requirements. Finally, in previous arrangements the air has been discharged from the cabin to atmosphere as waste e. g. through a relief valve. For these reasons it is preferable to employ an independently driven air compressor for pressurizing the aircraft cabin and the object of this invention is to provide an improved independent pressurizing plant for this purpose. In another aspect the invention is concerned with aircraft in which hot air is circulated through ducts in the wings or other parts to prevent or minimise ice formations.

According to the present invention there is provided in an aircraft, apparatus for pressurizing the cabin and/or de-icing the wings or other parts of the aircraft, comprising an air compressor delivering air into the cabin to maintain a suitable air pressure therein and/or through de-icing ducts and an internal combustion turbine which drives the compressor and takes in combustion air from the cabin and/or the ducts. The products of combustion and excess air may be discharged as a jet to provide propulsive thrust for the aircraft. Preferably the combustion air passes directly from the cabin and/or the de-icing ducts to a combustion chamber or chambers of the turbine.

According to another feature of the invention there is provided means for controlling the speed of the turbine so as to maintain the required pressure in the aircraft cabin. Such means may be responsive to the pressure within the cabin and/or the ambient pressure and operable to control the fuel supply to the turbine.

Specific embodiments of the present invention will now be described, by way of example, with referenc to the accompanying drawing whereof:

Figure 1 is a diagrammatic view of one form of cabin pressurizing apparatus in accordance with the invention, Figure 2 is a fragmentary view showing a control for the apparatus of Figure 1, Figure 3 is a diagrammatic view showing yet another construction of cabin pressurizing apparatus, and Figure 4 is a top plan view of an airplane showing a main power installation in addition to the improved auxiliary power unit.

Referring to Figure 1: the cabin pressurizing apparatus comprises a single entry centrifugal compressor generally indicated by the reference numeral 6. The impeller 8 of the compressor is of single or double shrouded construction and is mounted on the shaft 5 by which it is driven so as to overhang it. The impeller rotates in the compressor casing, which is formed with bearing 9 disposed solely behind the rear shroud. In this way it is ensured that there is no possibility of the air passing through the compressor being contaminated by oil from the bearing 9.

The shaft 5 also carries the rotor 14 of a turbine which drives the compressor.

The compressor 6 delivers air by a duct 10 to a cabin 7 of the aircraft which is to be pressurized. The air outlet from the cabin communicates by a duct 11 with one or more combustion chambers 12 which is supplied with fuel by pipe 13. The fuel is burnt in the combustion chambers and the products of combustion pass therefrom and through the turbine and are discharged from it through a jet pipe 15 so as to provide propulsive thrust for the aircraft. The aircraft is assumed to be travelling in the direction of the arrow 50. To augment this thrust the compressor 6 may be of the two-stage type: this would also enable the pressurizing apparatus to be used to greater altitudes.

It will be seen that the pressurizing apparatus is in effect a gas turbine engine in which the aircraft cabin 7 to be pressurized forms part of the conduit by which air from the compressor is conveyed to the combustion chambers. In this way the cabin air is not discharged as waste as in previous arrangements but is utilised to good purpose thereby increasing the overall efficiency of the pressurizing apparatus over such previous arrangements.

The compression of the air by the compressor 6 raises its temperature so that heated air is delivered to the cabin 7 to maintain or assist in maintaining a suitable temperature within the cabin. Heat may be added to the pressurizing air by passing it through a heat exchanger or heat may be abstracted from the air by passing it through a cooler. Provision may be made for injecting water into the pressurizing air to control its humidity.

In the case of an aircraft designed to carry 60 people in the cabin, the air compressor should be of such size as to deliver approximately 1 lb. of air per second when the aircraft is flying at 400 M. P. H. at 40,000 feet and it requires about 90 B. H. P. to drive. Allowing for pressure losses in the various conduits and for air leakage from the cabin the turbine will develop about 123 B. H. P. of which about 33 B. H. P. will be developed as useful thrust assisting in the propulsion of the aircraft. The temperature in the combustion chambers would be about 770° C. absolute, which is very considerably below the maximum combustion temperature which can be employed in gas turbines so that the turbine should have a very long life. It is estimated that the weight of the plant would be less than half the weight of an independent pressurizing plant employing a reciprocating engine so that a desirable economy in weight is obtained without the disadvantages of using the main engine to drive the pressurizing air compressor.

The fuel supply to the combustion chambers is controlled so that the compressor 6 will be driven at a suitable speed for delivering air at the required pressure to the cabin 7. To this end the fuel supply may be controlled by a device responsive to the pressure in the cabin as is shown in Figure 2. Fuel passes by pipe 13 to the combustion chambers and there is provided a valve 21 to adjust the flow of the fuel. The valve 21 is actuated by a stack of capsules 19 mounted within the cabin 7 and connected with the valve by the linkage 20. With the arrangement described a fall in pressure within the cabin will result in the stack 19 adjusting valve 21 by linkage 20 so as to increase the fuel supply to the combustion chambers. When the pressure within the cabin 7 rises beyond a certain value the reverse operation is initiated by the stack of capsules 19.

The fuel supply to the combustion chambers may, alternatively, be controlled by means responsive to the ambient pressure to increase the fuel supply as this pressure falls. Alternatively, the fuel may be controlled by means responsive both to the cabin pressure and the ambient pressure.

In certain circumstances it may be found desirable for the pressurizing apparatus to be used to ventilate the cabin 7 when the aircraft is standing on the ground in the sun to prevent the cabin temperature becoming excessive as it is liable to do in these circumstances, particularly in the tropics. Accordingly means may be provided for running the engine at slow speed on the ground to circulate air through the cabin without materially increasing the pressure and temperature of the air. Such an arrangement is illustrated in Figure 3 where, in order to maintain the turbine in operation when the cabin door 23 is open for loading, the compressor 6 delivers to the duct 11 by means of a pipe 22. The compressor therefore delivers to the combustion chambers partly through the cabin 7 and partly along the pipe 22. The quantity of air passing through the pipes 10 and 22 is varied by butterfly valves 24 and 25 which are interconnected by a linkage with each other and with the cabin door. In this way whenever the cabin door is opened the butterfly valve 24 is partly closed and the butterfly valve 25 correspondingly opened. If desired the valves 24, 25 may be independently or simultaneously adjusted by hand.

The plant may be started when the aircraft is in flight and ascending so that some ram effect will be obtained from the motion of the aircraft which, with the differential pressure across the cabin due to the ascent of the aircraft, will assist in making the starting of the plant easy. With the arrangement of Figure 3 starting may be made on the ground with the aeroplane stationary so that the pressurizing apparatus may be used for ventilating the cabin.

Instead of, or in addition to, delivering air to the cabin, the compressor may deliver the whole or part of the air through de-icing ducts extending along the wings and engine nacelles and returning to the combustion chamber or chambers. The air circulated through the ducts and heated by compression, acts, in known manner, to prevent or minimise ice formation on the wings and engine nacelles and it may be further heated by burning fuel in it at the inlet to the ducts.

We claim:

1. An aircraft structure having a cabin and a loading door for said cabin, and comprising an air compressor, ducting from the delivery side of said compressor to said cabin, a first valve in said ducting to control the flow of air from said compressor to said cabin, an outlet from said cabin, combustion equipment connected to said outlet to take in combustion air from said cabin, a duct leading from the delivery side of said compressor to said combustion equipment to by-pass said cabin, a second valve arranged in said duct to control the air flow along said duct from said compressor to said combustion equipment, means connecting said loading door to said second valve to open said second valve when the door is opened, means interconnecting said first and second valves so that as one valve opens the other valve closes, a gas-turbine connected to receive combustion products from said combustion equipment and constituting the sole means for converting heat energy in said combustion products into mechanical shaft power, and a driving connection from said turbine to drive said compressor.

2. An aircraft structure having a cabin and a loading door for the cabin, and comprising an air compressor, ducting from the delivery side of said compressor to said cabin, an outlet from said cabin, combustion equipment connected to the said outlet to take in combustion air from said cabin, a duct from the compressor to the combustion equipment to by-pass said cabin, a valve to control the air flow along said duct, means connecting said loading door to the valve to open the valve when the door is opened, a gas turbine connected to receive combustion products from said combustion equipment and constituting the sole means for converting heat energy in said combustion products into mechanical shaft power, and a driving connection from said turbine to drive said compressor.

STANLEY GEORGE HOOKER.
HARRY PEARSON.

References Cited in the file of this patent

UNITED STATES PATENTS

| Number | Name | Date |
|---|---|---|
| 2,041,790 | Stalker | May 26, 1936 |
| 2,085,761 | Lysholm | July 6, 1937 |
| 2,119,402 | Puffer | May 31, 1938 |
| 2,256,393 | Klein | Sept. 16, 1941 |
| 2,264,297 | Clay | Dec. 2, 1941 |
| 2,297,495 | Pfau | Sept. 29, 1942 |
| 2,383,385 | Heintze | Aug. 21, 1945 |
| 2,411,227 | Planiol et al. | Nov. 19, 1946 |
| 2,427,845 | Forsyth | Sept. 23, 1947 |
| 2,491,462 | Wood | Dec. 13, 1949 |